(12) United States Patent
Raut (10) Patent No.: US 7,423,974 B2
(45) Date of Patent: Sep. 9, 2008

(54) DISABLING MUTUALLY RECURSIVE ROUTES

(75) Inventor: Devendra Raut, Cupertino, CA (US)

(73) Assignee: Alcatel, Paris (FR)

( * ) Notice: Subject to any disclaimer, the term of this patent is extended or adjusted under 35 U.S.C. 154(b) by 885 days.

(21) Appl. No.: 10/837,225

(22) Filed: Apr. 30, 2004

(65) Prior Publication Data

US 2005/0243839 A1  Nov. 3, 2005

(51) Int. Cl.
*H04L 12/26* (2006.01)
*H04L 12/28* (2006.01)
(52) U.S. Cl. .................................. 370/248; 370/392
(58) Field of Classification Search ............... 370/392, 370/396, 248, 229–235.1; 709/239
See application file for complete search history.

(56) References Cited

U.S. PATENT DOCUMENTS

| | | | |
|---|---|---|---|
| 7,185,107 B1 | 2/2007 | Cassar | 709/239 |
| 7,280,486 B2 * | 10/2007 | Suri | 370/248 |
| 2002/0141343 A1 * | 10/2002 | Bays | 370/235 |
| 2005/0068968 A1 * | 3/2005 | Ovadia et al. | 370/396 |
| 2005/0175341 A1 | 8/2005 | Ovadia | 398/43 |
| 2005/0243839 A1 | 11/2005 | Raut | 370/395.54 |
| 2006/0013232 A1 * | 1/2006 | Xu et al. | 370/396 |
| 2006/0101157 A1 * | 5/2006 | Eardley | 709/239 |
| 2006/0215579 A1 | 9/2006 | Nadeau et al. | 370/254 |
| 2007/0112975 A1 | 5/2007 | Cassar | 709/239 |
| 2007/0121524 A1 | 5/2007 | Rangarajan et al. | 370/252 |

* cited by examiner

*Primary Examiner*—Edan Orgad
*Assistant Examiner*—Ho Chuong
(74) *Attorney, Agent, or Firm*—Van Pelt, Yi & James LLP

(57) ABSTRACT

Disabling mutually recursive routes is disclosed. An event that results in a routing table update is received. A next hop table is updated to reflect the event. It is determined whether the event is associated with an exterior protocol route. The next hop table is used to perform a recursion check if it is determined that the event is associated with an exterior protocol route.

7 Claims, 10 Drawing Sheets

BGP Table

Next Hop Table

Routing Table

BGP Table

Next Hop Table

Routing Table

FIG. 3

BGP Table

Next Hop Table

Routing Table

FIG. 4

BGP Table

Next Hop Table

Routing Table

FIG. 5

BGP Table

Next Hop Table

Routing Table

FIG. 6

BGP Table

Next Hop Table

Routing Table

DISABLING MUTUALLY RECURSIVE ROUTES

FIELD OF THE INVENTION

The present invention relates generally to routing. More specifically, disabling mutually recursive routes is disclosed.

BACKGROUND OF THE INVENTION

Routing protocols add and update information for routing data, e.g., in a computer network environment. Routing information may be stored in a routing table or other data structure. A typical routing table entry in an IP network environment includes a range of IP addresses to which the entry applies and a "next hop" entry that identifies a next hop router connected to the router to which the table applies by a direct physical connection (e.g., Ethernet, serial, other) to which data (e.g., packets) addressed to an IP (or other) address associated with the entry may be sent for delivery. Exterior routing protocols exist to facilitate the exchange of data between autonomous systems (e.g., separate provider, enterprise, and/or other networks) and interior routing protocols enable data routing within an autonomous system.

Because of these different sources for information (exterior and interior routing protocols, e.g.), the multiple possible routes to be taken to a given destination, and the priorities given to them, there is a possibility that a mutually recursive route pair will end up in a routing table. It would be better if these mutually recursive routes could be identified and removed from the table so that traffic could be appropriately directed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
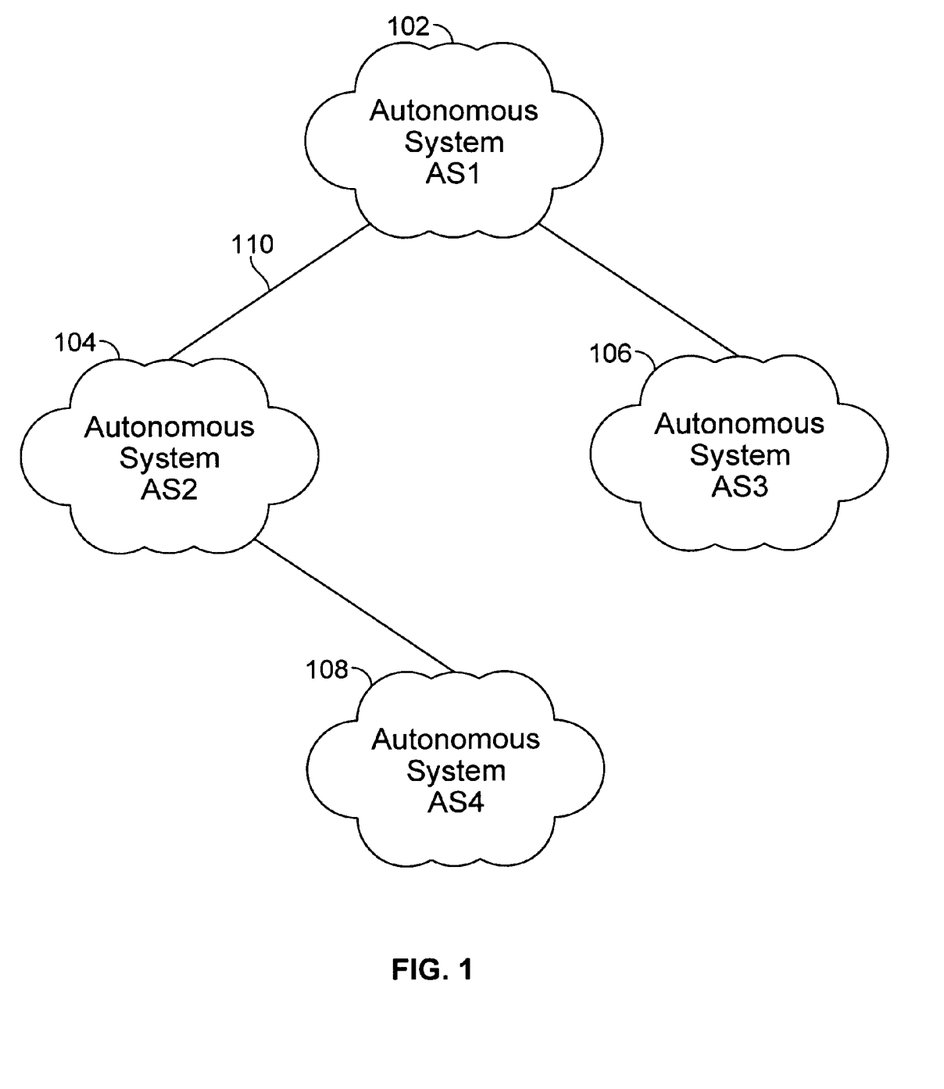
FIG. 1 is a block diagram illustrating connectivity between autonomous systems.

FIG. 1 is a block diagram illustrating connectivity between autonomous systems. An autonomous system is a network that includes routers, computers, network-attached peripherals, and interconnections. An autonomous system may be associated, for example, with a particular enterprise, service provider, or other entity. Within an autonomous system, computers route traffic using an interior routing protocol such as Routing Information Protocol (RIP) or Open Shortest Path First (OSPF). Between autonomous systems an exterior routing protocol is used such as Border Gateway Protocol (BGP). The exterior routing protocol is used to exchange routing information between autonomous systems. In the example shown in FIG. 1, autonomous system ASI (102) has no direct connection to autonomous system AS4 (108). However, an exterior routing protocol such as BGP may be used in the example shown to enable one or more routers associated with AS1 to learn that they can reach AS4 by sending packets addressed to a destination associated with AS4 to AS2 (104) via the direct connection (110) between AS1 and AS2. In the example shown, AS3 (106) does not have a connection to AS4. If there were a connection between AS3 and AS4, BGP or another exterior routing protocol would be used to determine the more preferable route for packets from AS1 to get to a destination associated with AS4.

Figure 2:
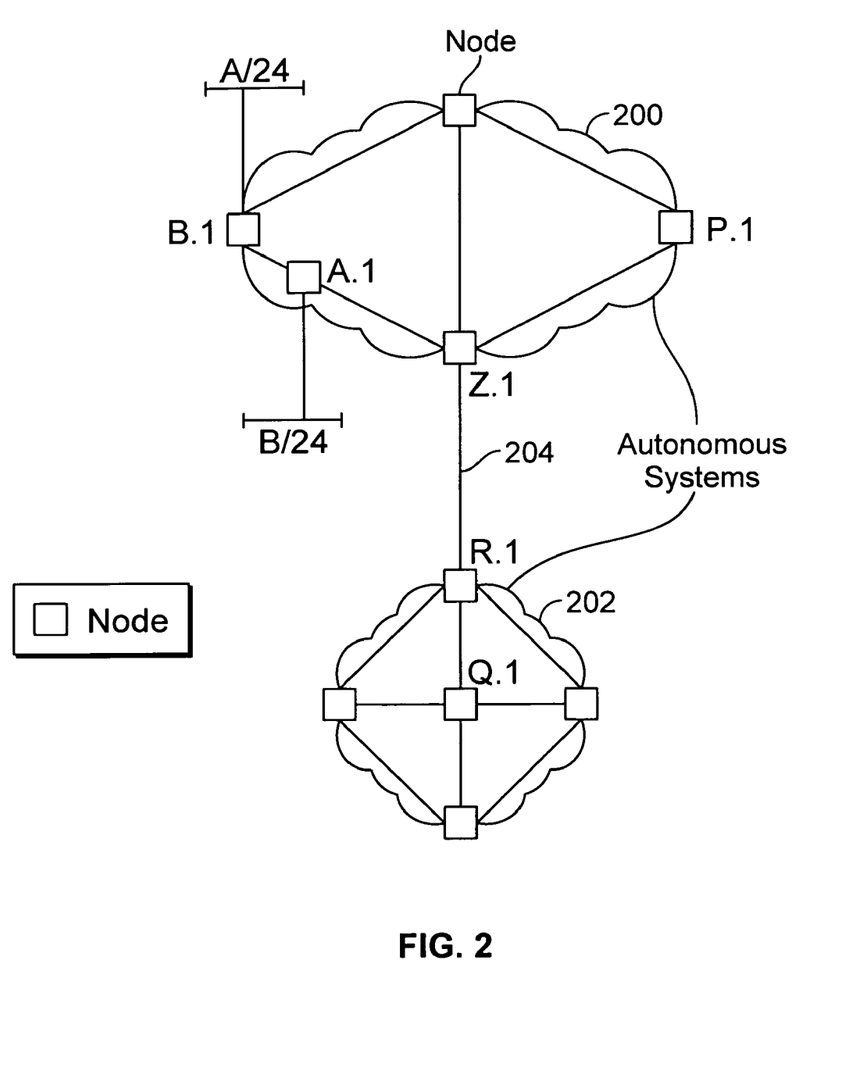
FIG. 2 is a block diagram illustrating an example of network connections.

FIG. 2 is a block diagram illustrating a network environment comprising two autonomous systems. Autonomous system 200 includes nodes P.1, Z.1, A.1, and B.1. As used herein, a notation in the form "x.1" is used to represent a particular router having a unique IP address ending, e.g., in "0.1", such as 196.0.0.1. There are connections between the nodes within autonomous system 200, but not all nodes are connected directly to each other. For example, P.11 is not directly connected to A.1 or B.1. Autonomous system 202 includes nodes Q.1 and R.1. There are also connections between the nodes within autonomous system 202, but not all nodes are connected directly to each other. Autonomous systems 200 and 202 are connected through connection 204 between node Z.1 of autonomous system 200 and node R.1 of autonomous system 202. Nodes within autonomous system 200 can reach destinations associated with autonomous system 202, and vice versa, by routing packets through nodes R.1 and Z.1 and the connection 204 between them. For example, node Q.1 in autonomous system 202 can reach destinations associated with nodes within autonomous system 200 (e.g., A.1 or B.1) by sending packets through R.1, connection 204, and Z.1.

In the example shown, and discussed more fully in connection with FIGS. 3-10, destinations in the IP address range A/24 are associated with router B.1 and addresses in the range B/24 are associated with router A.1. The notation "A/24" indicates a range of IP addresses having the same 24 most significant bits as the fictitious address "A". For example, the range 196.20.5.1/24 would encompass all addresses in the range 196.20.5.x. In the example shown, it is supposed that B.1 has learned that it can reach addresses in the range A/24 by sending packets having a destination address in the range A/24 to router A.1, to which it has a direct physical connection.

Figure 3:
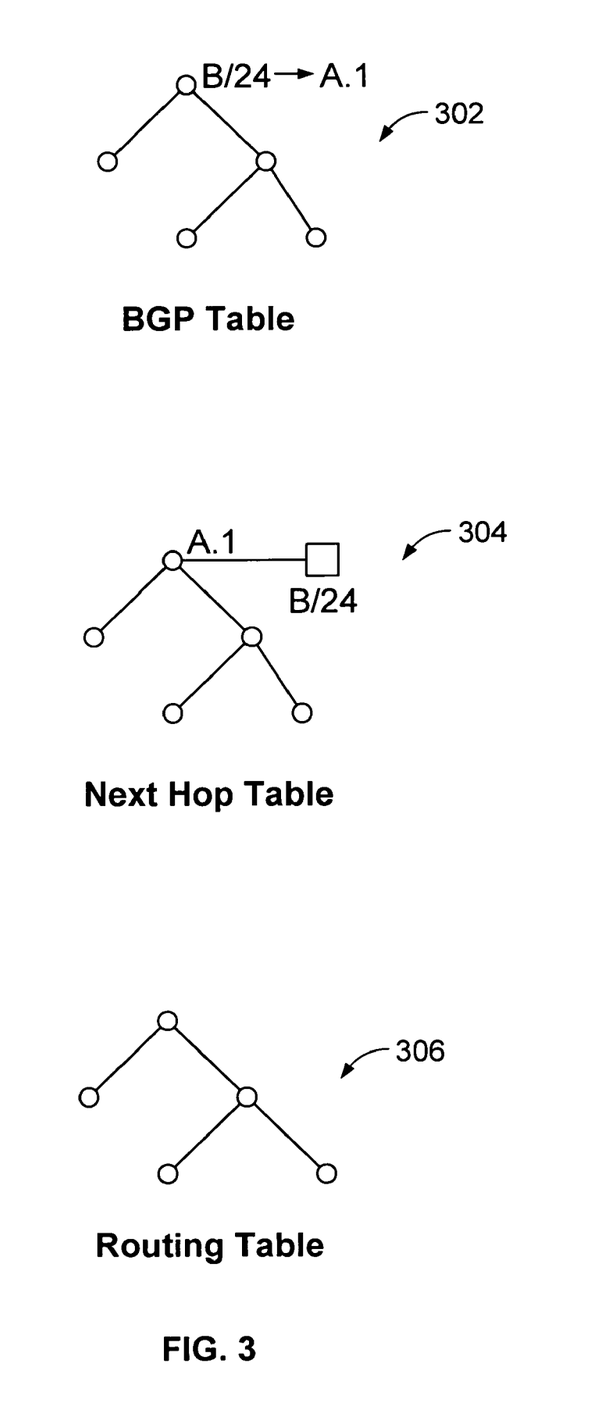
FIG. 3 is the state of three tables at time $t_0$ used for routing traffic.

FIG. 3 is the state at time $t_0$ of three tables used for routing traffic. In the examples shown in FIGS. 3-7, the tables may apply, e.g., to a router associated with an autonomous system such as autonomous system 202 of FIG. 2, e.g., Q.1 or R.1. An exterior protocol table 302 receives exterior routing protocol information through a message indicating that the addresses B/24 can be reached through A.1. In one embodiment, the exterior protocol is BGP, the exterior protocol table is a BGP table, and the message is a BGP protocol message that arrives via TCP/IP, for example. A next hop table (or index) 304 for use in identifying mutually recursive routes is disclosed. The information received via the exterior routing protocol and entered in the exterior routing protocol table 302 is used to update the next hop table 304. The next hop table 304 includes the routing information of exterior routing table 302 indexed by the next hop that is used to reach each address or address range. In this case, an entry is made in the next hop table indicating that A.1 is the next hop for traffic that is addressed to B/24. The information is not used to update the routing table 306 at this time, because the local node is not directly connected to A.1 and at this point does not know how to get there. So, this information is not reflected in the routing table 306 at time $t_0$.

Figure 4:
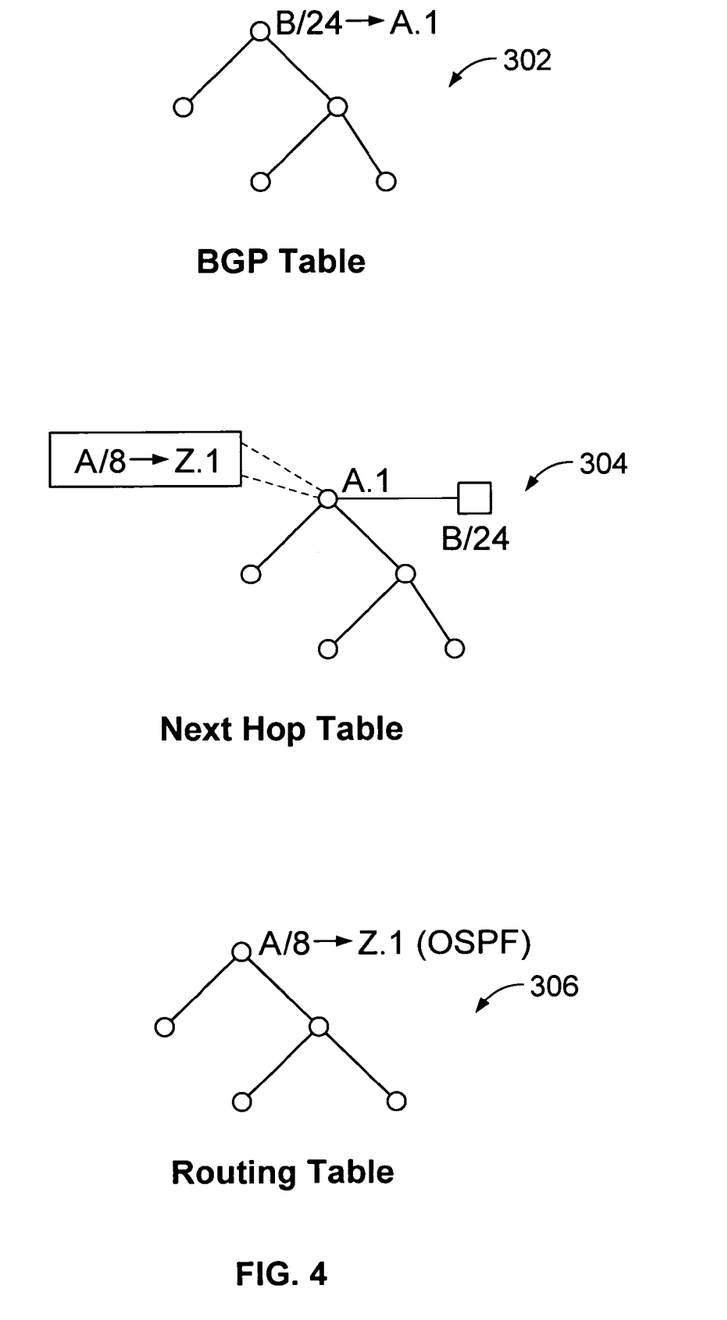
FIG. 4 is the state of three tables at time $t_1$ used for routing traffic.

FIG. 4 is the state at time $t_1$ of three tables 302-306 used for routing traffic. The routing table 306 receives interior routing protocol information through a message indicating that the addresses A/8 can be reached through Z.1. In one embodiment, this message is an OSPF protocol message. This information is used to update the next hop table 304. The entry for next hop A.1 has been updated to reflect that the next hop "A.1" is resolved by the OSPF route A/8→Z.1, because in this example A.1 is a router in the address range A/8, now reachable through Z.1. In some embodiments, an entry not shown in FIG. 4 is made in next hop table 304 for next hop Z.1 to reflect the OSPF route A/8→Z.1 pointing to next hop Z.1. Referring back to FIG. 2, using OSPF, for example, routers in autonomous system 202, such as routers Q.1 and R.1, can learn through OSPF routes associated with routers such as Z.1 that are one hop beyond the boundary of their autonomous system. OSPF is a link state protocol and, as a result, the router associated with the tables shown in FIG. 4 knows how to reach Z.1 based on the OSPF information, even if it does not have a direct physical connection to Z.1.

Figure 5:
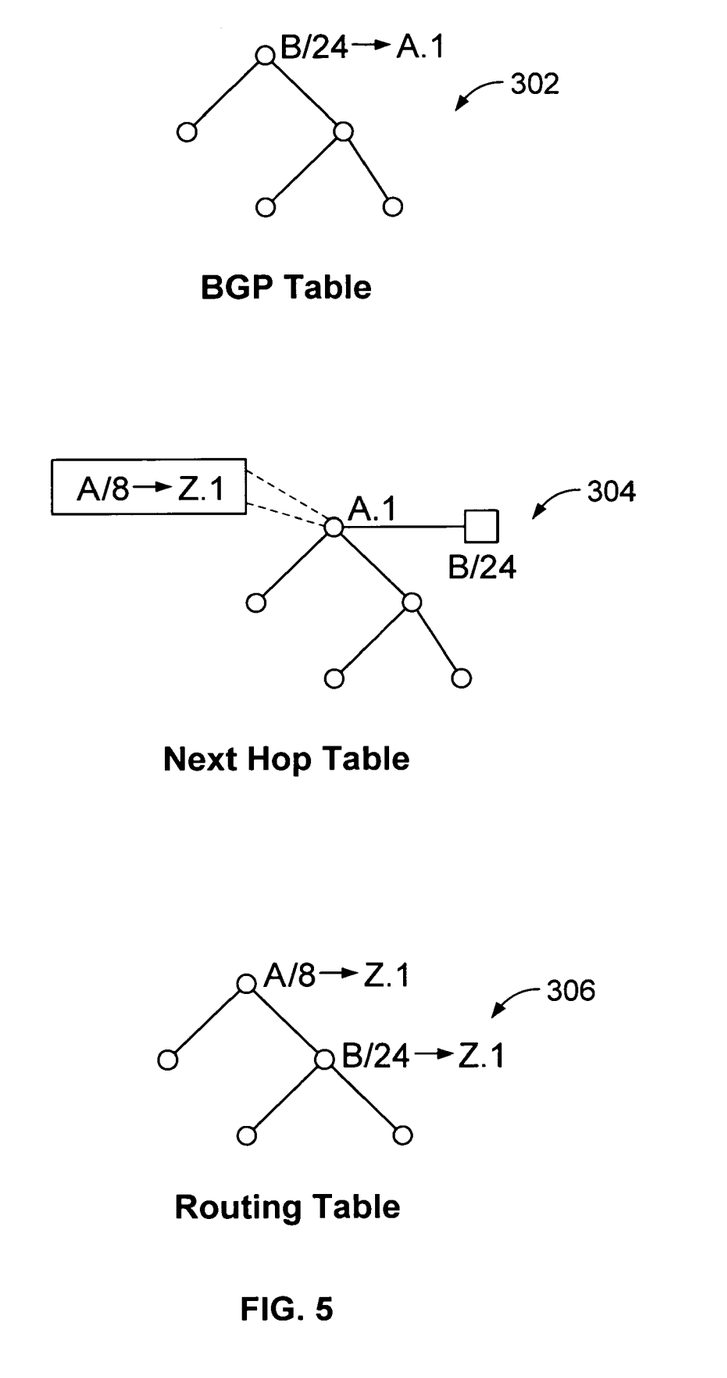
FIG. 5 is the state of three tables at time $t_2$ used for routing traffic.

FIG. 5 is the state at time $t_2$ of three tables used for routing traffic. The routing table 306 has been updated to reflect the fact that addresses B/24 can now be reached through Z.1, because the formerly inactive BGP route B/24→A.1 has become active as a result of the availability of helper OSPF route A/8→Z.1. Referring back to FIG. 2, a router in autonomous system 202 (e.g., R.1 or Q.1), e.g., with a routing table as shown in FIG. 5 could reach addresses B/24 by using OSPF route A/8→Z.1 as a helper route to get packets destined for an address in the range B/24 to A.1 via Z.1, for example.

Figure 6:
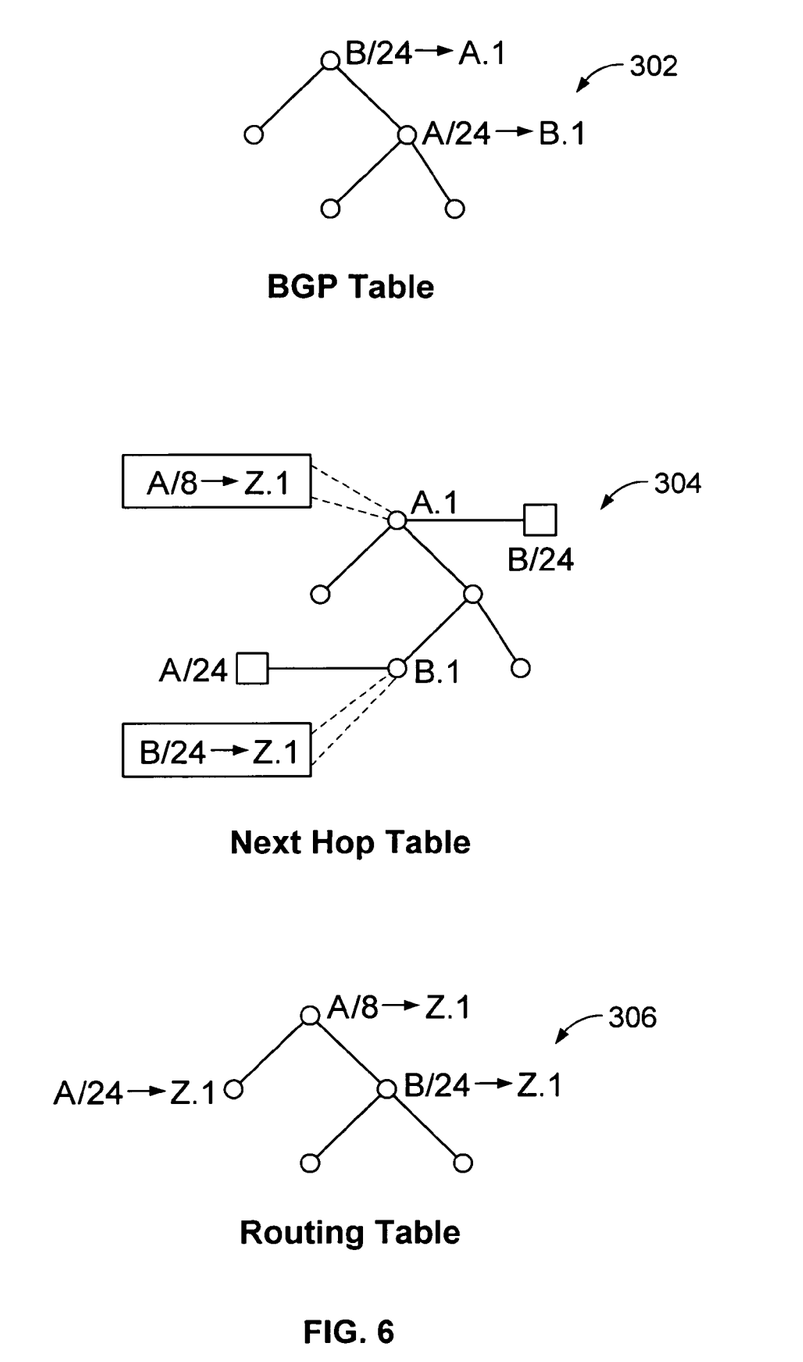
FIG. 6 is the state of three tables at time $t_3$ used for routing traffic.

FIG. 6 is the state at time $t_3$ of three tables used for routing traffic. The exterior protocol table 302 receives exterior routing protocol (e.g., BGP) information through a message indicating that the addresses A/24 can be reached through B.1. This information is used to update the next hop table 304. In this case, an entry is made in the next hop table 304 indicating that B.1 is the next hop for traffic that is addressed to A/24. The route B/24→Z.1 from routing table 306 resolves next hop B.1. Because B.1 can be reached through Z.1, and addresses A/24 can be reached through B.1, the routing table 306 is updated to show that A/24 addresses can be reached through Z.1.

Figure 7:
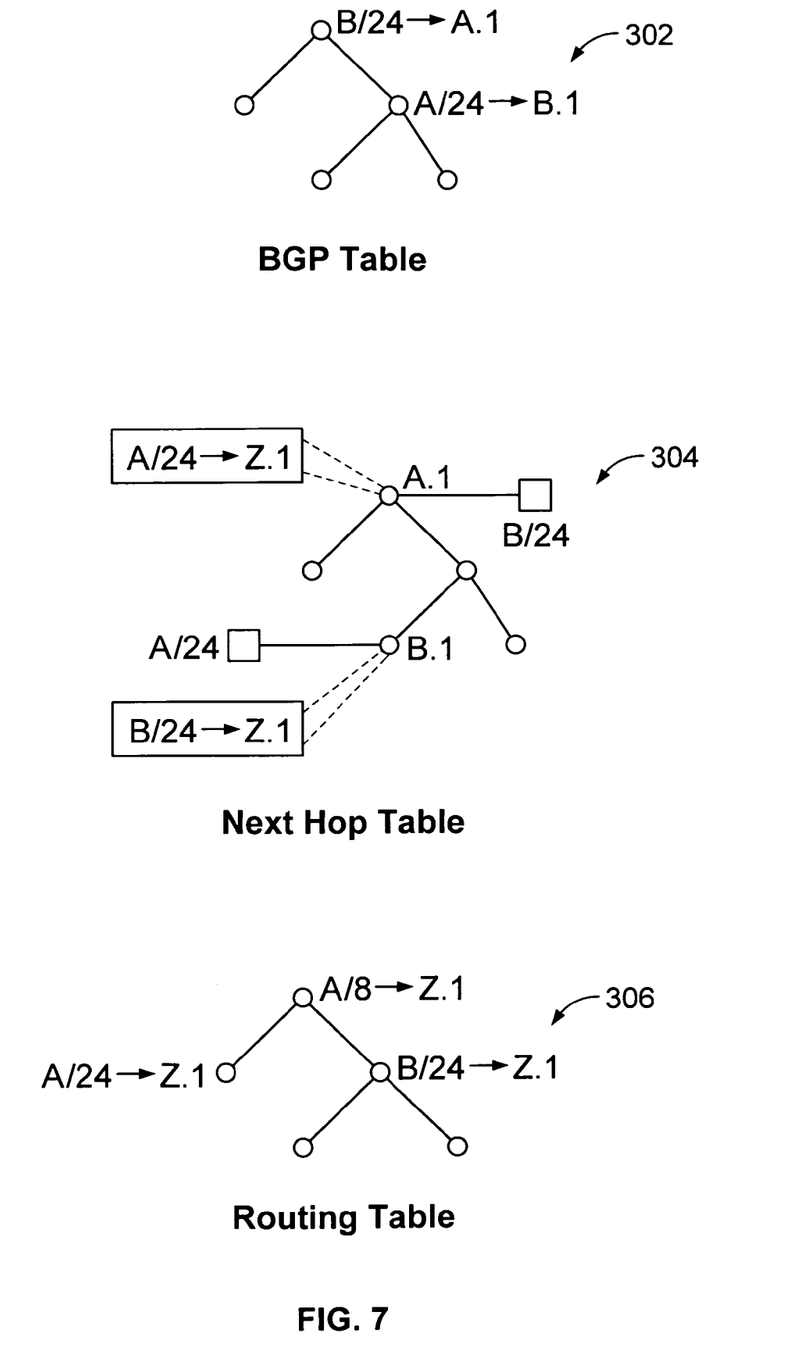
FIG. 7 is the state of three tables at time $t_4$ used for routing traffic.

FIG. 7 is the state at time $t_4$ of three tables used for routing traffic. The routing table 306 prefers more specific addresses over less specific addresses. For example, the route in which A/24 addresses can be reached through Z.1 is preferred over the route in which A/8 addresses can be reached through Z.1, because the former route is more specific, in the sense that 196.8.0.1/24 is more specific than 196.8.0.1/8 because the former is specific to addresses in the range 196.8.0.x whereas the latter includes all addresses in the range 196.x.x.x. This information is now used to update the next hop table 304. In particular, the next hop A.1, formerly resolved by the OSPF route A/8→Z.1 is now shown in FIG. 7 as being resolved by the more specific BGP route A/24→Z.1.

Figure 8:
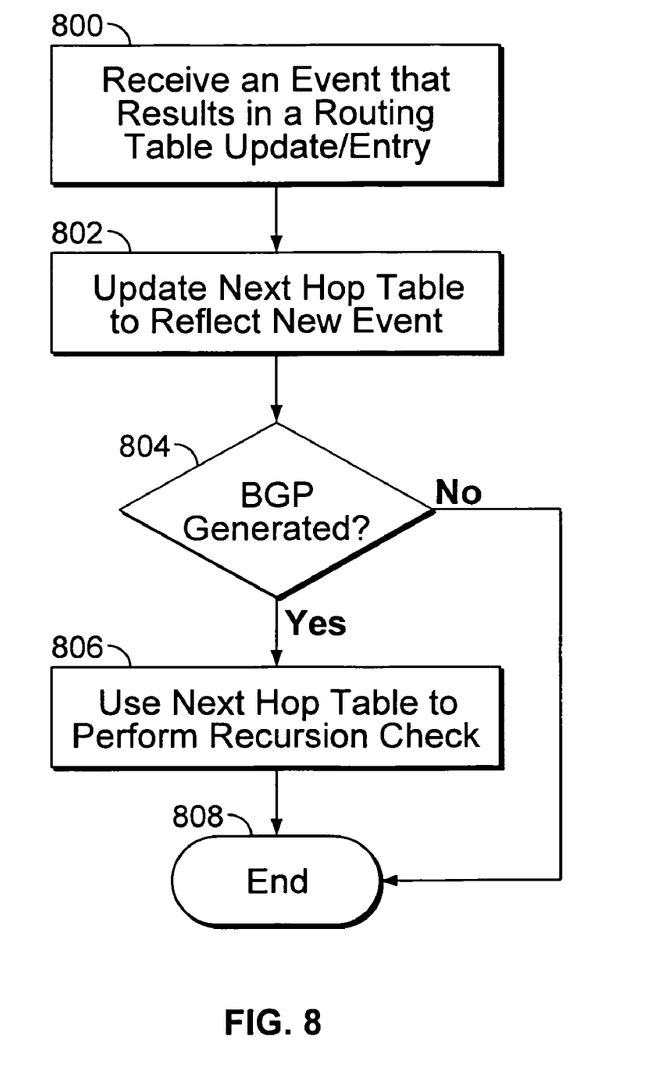
FIG. 8 is a flow diagram illustrating a method for finding mutually recursive routes.

FIG. 8 is a flow diagram illustrating a method for finding mutually recursive routes. In step 800, an event is received that results in a routing table update or entry. In step 802, the next hop table (or index) is updated to reflect the update or entry in the routing table. In step 804, it is determined whether the update to the next hop table was generated as a result of an exterior routing protocol event (for example, a new BGP route). If it is determined in step 804 that the event was BGP-generated, the next hop table is used in step 806 to perform a check for mutually recursive routes, after which the process ends in step 808. If it is determined in step 804 that the event was not BGP-generated, the process ends in step 808. In some embodiments, the recursion analysis (806) is performed only in response to BGP-generated events because the BGP protocol specifications do not prescribe or provide a way to check for mutually recursive routes.

Figure 9:
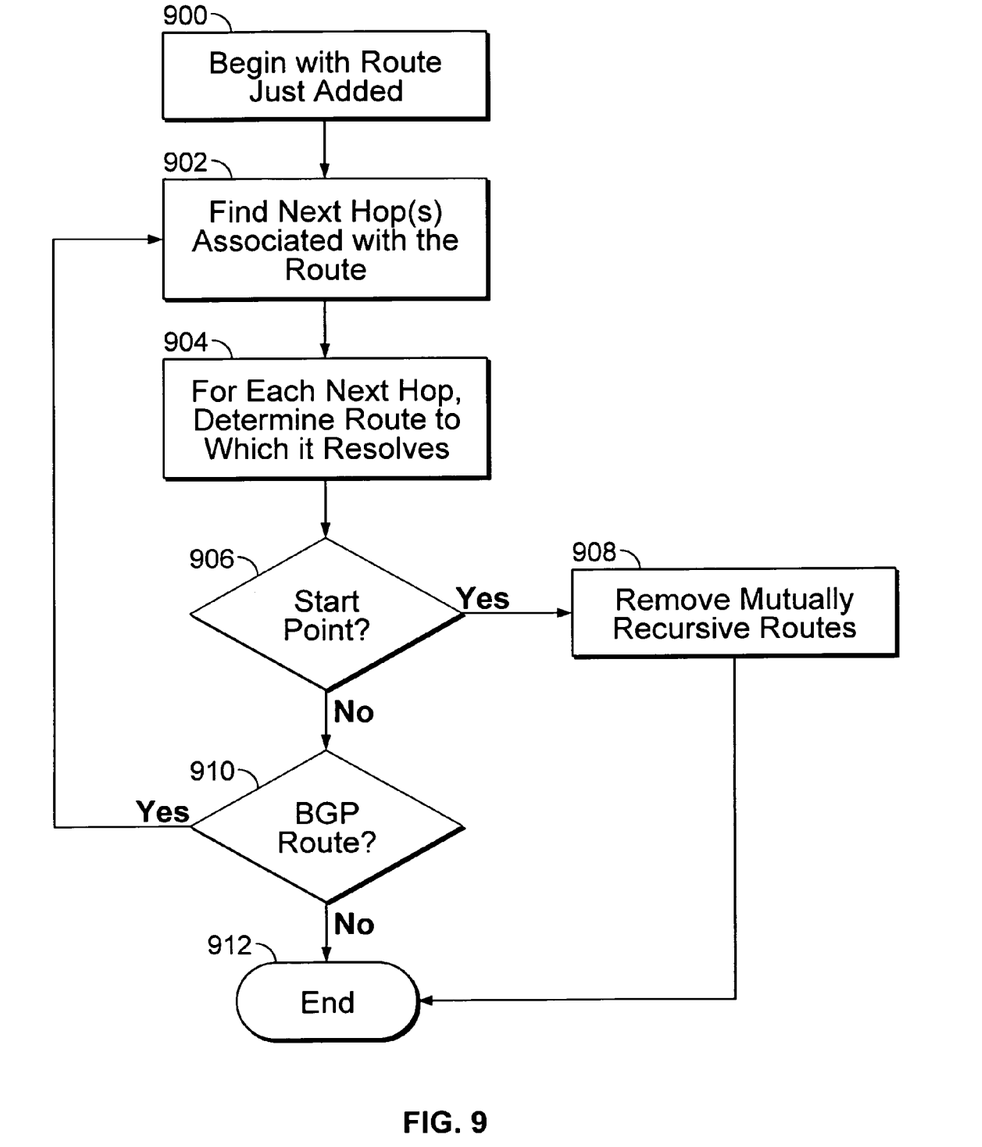
FIG. 9 is a flow diagram illustrating a method for checking for mutually recursive routes using the next hop table.

FIG. 9 is a flow diagram illustrating a method for checking mutually recursive routes using a next hop table or index. In step 900, the check for mutually recursive routes begins by examining the route just updated or entered. In step 902, the next hop(s) are found that are associated with the route. In step 904, for each of the next hop(s), the route to which that next hop resolves is determined. In step 906, it is determined if the route to which the hop resolves is the same route at which the recursion analysis started (i.e., has the process come full circle?). If the route is the same one at which the recursion analysis started, the process proceeds to step 908 in which the routes to which this and previous next hops identified in the recursion analysis resolve (i.e., routes identified in step 904 in prior iterations of steps 902-906) are removed because they are mutually recursive, after which the process ends in step 912. If it is determined in step 906 that the route to which the next hop resolves is not the same route at which the recursion analysis started, the process advances to step 910 in which it is determined if the route is a BGP route. Arriving at a next hop that is resolved by an interior protocol route, such as an OSPF route, would indicate mutually recursive BGP routes are not present as a result of the addition of the BGP route the arrival of which prompted the analysis shown in FIG. 9 to be initiated. If it is a BGP route, the process returns to step 902, in which the next hop(s) associated with the route that resolves the previously-considered next hop is(are) found. If it is determined in step 910 that the resolving route is not a BGP route, the process ends in 912.

Figure 10:
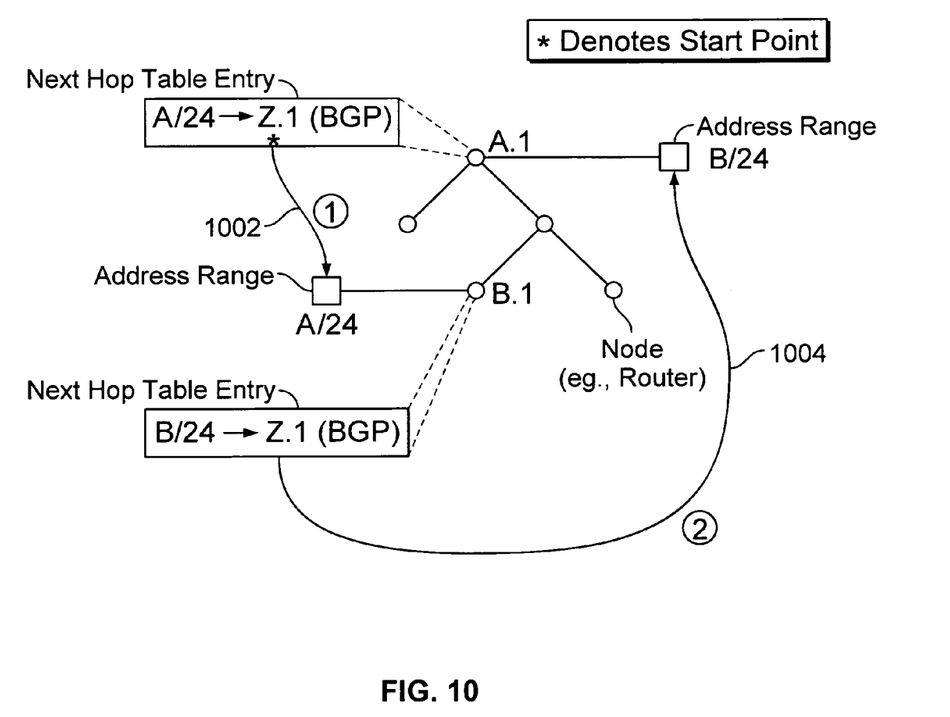
FIG. 10 is a block diagram illustrating a check for mutually recursive routes at time $t_4$ on the next hop table.

FIG. 10 is a block diagram illustrating a recursion check performed at time $t_4$ on a next hop table having entries as shown in FIG. 7. At time $t_4$, the next hop table was updated by substituting the more specific BGP route A/24→Z.1 for OSPF route A/8→Z.1 as the resolving route for next hop A.1. As in FIG. 9, the recursion analysis begins with the route just added or updated, i.e., the BGP route A/24→Z.1 (900). Next, the next hops associated with this updated entry are examined (902). The arrow 1002 shows that the next hop table (or index) can be used to determine that route A/24 points to next hop B.1. This route resolves to a route in which B/24 addresses can be reached through Z.1 (904). It is then determined that the route currently being considered is not the starting point for the current recursion analysis (906). It is determined that the route currently being considered, BGP route B/24→Z.1, is a BGP route (910). Arrow 1004 shows that the next hop table (or index) can be used to determined that route B/24 points to next hop A.1 (902). Next hop A.1 resolves to BGP route A/24→Z.1 (904), which is recognized as the starting point for the current recursion analysis (906). The mutually recursive routes A/24→Z.1 and B/24→Z.1 are removed from the next hop table and the routing table (908), after which the recursion analysis ends.

Note that if the recursion analysis had been performed at time t3 (FIG. 6), after BGP route B/24→Z.1 became active, the result would have been different. The analysis would have started with route B/24→Z.1. It would have been determined that address B/24 pointed to next hop A.1 and that next hop A.1 resolved to OSPF route A/8→Z.1, which would have been recognized as not a BGP route, at which point the analysis would have ended without any routes being identified as mutually recursive.

Using a next hop table or index as described herein enables one to quickly and efficiently determine whether mutually recursive routes are present. Using just the classic routing table structure, an exponential exhaustive search of the routing table entries would be required to identify mutually recursive routes. Using the next hop table or index disclosed herein, mutually recursive routes can be identified in linear search time Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for disabling mutually recursive routes comprising:
   receiving an event that results in a routing table update,
   updating a next hop table to reflect the event,
   determining whether the event is associated with an exterior protocol route, and
   using the next hop table to perform a recursion check if it is determined that the event is associated with an exterior protocol route;
   wherein the recursion check comprises:
      starting with a first route associated with the event,
      finding a first next hop associated with the first route,
      determining a second route to which the first next hop resolves,
      determining whether the second route is the same as the first route,
      removing the first route and the second route if it is determined that the second route is the same as the first route;
   determining, in the event that the second route is not the same as the first route, whether the second route is an exterior protocol route, and
   if it is determined that the second route is an exterior protocol route, performing successive iterations of the following steps, with respect to the second route and any subsequent exterior protocol routes identified by performing an iteration of the following steps, until an non-exterior protocol route or the first route is found:
      finding a next hop associated with the route,
      determining a resolving route to which the next hop resolves,
      determining whether the resolving route is the same as the first route, and
      if it is determined that the resolving route is the same as the first route, removing the first route, the second route, the resolving route, and any other route identified in a previous iteration of the above three steps;
   as the resolving route.

2. A method for disabling mutually recursive routes as in claim 1 wherein the exterior protocol is the border gateway protocol (BGP).

3. A method for disabling mutually recursive routes as in claim 1 wherein the recursion check further comprises:
   ending the recursion check without disabling any routes if it is determined that the second route is not the same as the first route and is not an exterior protocol route.

4. A system for disabling mutually recursive routes comprising:
   a memory configured to store a routing table and a next hop table; and
   a processor configured to:
      receive an event that results in an update to the routing table,
      update the next hop table to reflect the event,
      determine whether the event is associated with an exterior protocol route, and
      use the next hop table to perform a recursion check if it is determined that the event is associated with an exterior protocol route;
   wherein the recursion check comprises:
      starting with a first route associated with the event,
      finding a first next hop associated with the first route,
      determining a second route to which the first next hop resolves,
      determining whether the second route is the same as the first route,
      removing the first route and the second route if it is determined that the second route is the same as the first route;
   determining, in the event that the second route is not the same as the first route, whether the second route is an exterior protocol route, and
   if it is determined that the second route is an exterior protocol route, performing successive iterations of the following steps, with respect to the second route and any subsequent exterior protocol routes identified by performing an iteration of the following steps, until an non-exterior protocol route or the first route is found:
      finding a next hop associated with the route,
      determining a resolving route to which the next hop resolves,
      determining whether the resolving route is the same as the first route, and
      if it is determined that the resolving route is the same as the first route, removing the first route, the second route, the resolving route, and any other route identified in a previous iteration of the above three steps;
as the resolving route.

5. The system for disabling mutually recursive route as recited in claim 4 wherein the recursion check further comprises ending the recursion check without disabling any routes if it is determined that the second route is not the same as the first route and is not an exterior protocol route.

6. A computer program product embodied in a computer readable storage medium for mutually disabling recursive routes, the computer program product comprising computer instructions executed by a computer processor for:
receiving an event that results in a routing table update,
updating a next hop table to reflect the event,
determining whether the event is associated with an exterior protocol route, and
using the next hop table to perform a recursion check if it is determined that the event is associated with an exterior protocol route;
wherein the recursion check comprises:
starting with a first route associated with the event,
finding a first next hop associated with the first route,
determining a second route to which the first next hop resolves,
determining whether the second route is the same as the first route,
removing the first route and the second route if it is determined that the second route is the same as the first route;
determining, in the event that the second route is not the same as the first route, whether the second route is an exterior protocol route, and
if it is determined that the second route is an exterior protocol route, performing successive iterations of the following steps, with respect to the second route and any subsequent exterior protocol routes identified by performing an iteration of the following steps, until an non-exterior protocol route or the first route is found:
finding a next hop associated with the route,
determining a resolving route to which the next hop resolves,
determining whether the resolving route is the same as the first route, and
if it is determined that the resolving route is the same as the first route, removing the first route, the second route, the resolving route, and any other route identified in a previous iteration of the above three steps;
as the resolving route.

7. The computer program product for disabling mutually recursive route as recited in claim 6 wherein the recursion check further comprises ending the recursion check without disabling any routes if it is determined that the second route is not the same as the first route and is not an exterior protocol route.

* * * * *